US008151266B2

(12) United States Patent  (10) Patent No.: US 8,151,266 B2
Jayaraman et al.  (45) Date of Patent: Apr. 3, 2012

(54) OPERATING SYSTEM FAST RUN COMMAND

(75) Inventors: Satya Jayaraman, Hyderabad (IN); Ashish Bajaj, Hyderabad (IN); Sachin Chaturvedi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1038 days.

(21) Appl. No.: 12/059,311

(22) Filed: Mar. 31, 2008

(65) Prior Publication Data

US 2009/0249345 A1  Oct. 1, 2009

(51) Int. Cl.
  *G06F 9/48* (2006.01)
  *G06F 12/08* (2006.01)
(52) U.S. Cl. ........................ 718/102; 718/103
(58) Field of Classification Search .................. None
  See application file for complete search history.

(56) References Cited

U.S. PATENT DOCUMENTS

| | | | | |
|---|---|---|---|---|
| 5,159,678 A | * | 10/1992 | Wengelski et al. | 711/153 |
| 5,321,835 A | * | 6/1994 | Tanaka et al. | 718/101 |
| 5,606,689 A | * | 2/1997 | Nakagawa | 1/1 |
| 5,826,078 A | * | 10/1998 | Funaki | 718/100 |
| 6,003,099 A | * | 12/1999 | Hintukainen | 710/52 |
| 6,832,367 B1 | * | 12/2004 | Choi et al. | 717/130 |
| 7,337,443 B2 | * | 2/2008 | Welland et al. | 718/102 |
| 7,536,690 B2 | * | 5/2009 | Alverson et al. | 718/102 |
| 7,587,625 B2 | * | 9/2009 | Alexander et al. | 714/6.24 |
| 7,681,076 B1 | * | 3/2010 | Sarma | 714/16 |
| 2001/0049764 A1 | * | 12/2001 | Lu et al. | 711/103 |
| 2004/0260758 A1 | * | 12/2004 | Hirata et al. | 709/200 |
| 2006/0225060 A1 | * | 10/2006 | Goyan | 717/151 |
| 2007/0296998 A1 | * | 12/2007 | Iwamoto et al. | 358/1.14 |

OTHER PUBLICATIONS

Anonymous: "Partial Swapping. Nov. 1980" IBM Technical Disclosure Bulletin, IBM Corp. New York, US, vol. 23, No. 6, (Nov. 1, 1980), p. 2505/2506, XP002124690.
International Serach Report—PCT/US09/037042, International Search Report—European Patent Office—Jun. 25, 2009.
Written Opinion—PCT/US09/037042, International Search Report—European Patent Office—Jun. 25, 2009.

* cited by examiner

*Primary Examiner* — Eric Coleman
(74) *Attorney, Agent, or Firm* — Peter M. Kamarchik; Nicholas J. Pauley; Jonathan T. Velasco

(57) ABSTRACT

A fast sub-process is provided in an operating system for a digital signal processor (DSP). The fast sub-process executes a sub-process without a kernel first determining whether the sub-process resides in an internal memory, as long as certain conditions have been satisfied. One of the conditions is that a programmer determines that the sub-process has been previously loaded into internal memory and executed. Another condition is that the programmer has ensured that a process calling the sub-process has not called any other sub-process between the last execution and the current execution request. Yet another condition is that the programmer ensures that the system has not called another overlapping sub-process between the last execution and the current execution request.

34 Claims, 4 Drawing Sheets

OPERATING SYSTEM FAST RUN COMMAND

TECHNICAL FIELD

The present disclosure relates to computer operating systems. More specifically, the present disclosure relates to memory management by an operating system.

BACKGROUND

Microprocessors have internal memory to store instructions and data for execution by the microprocessor. Microprocessors can use external memory in some cases, however, accessing external memory by a microprocessor is more time consuming than accessing internal memory. Although internal memory is faster, an amount of internal memory available is usually much smaller than an amount of external memory available to the microprocessor. In some cases, the microprocessor is not allowed to execute out of the external memory.

Memory management support is desirable when a microprocessor's internal memory is smaller than the size of software images containing instructions to be executed. Such memory management should ensure that process units (of the required software images) reside in internal memory when necessary and reside in less expensive memory at other times. For example, when called, process units should be moved from a memory space that cannot be used for execution into an internal memory space that can be used for execution.

The same holds true for operands. There may not be enough room in an internal memory space for the operands needed to execute a task because another process is running in that internal memory space. Thus, when internal memory space limitations such as these occur, the operands are often moved to another accessible memory region. However, at some later time it may be desirable to use the faster internal memory for the operands.

Although a two level memory cache associated with enough memory to store entire software images could help with (or eliminate the need for) memory management, some microprocessors, for example digital signal processors (DSPs) do not always include such a two level memory cache architecture. If the amount of available memory is insufficient to load entire software images, memory management is required.

Although hardware memory management solutions are available, some architectures do not permit use of such hardware. When hardware is not available, one type of memory management has an operating system move whole memory regions at once. A problem with moving the whole memory space is that the memory bus bandwidth will act as a constraint. Additional drawbacks include latency in software and higher power consumption.

Another memory management solution minimizes an amount of memory actually moved from one type of memory to another. In this solution, an executing process is segmented into portions or "bins." Thus, only some bins and not the whole process can be swapped out to create space for the newly executing process.

Known operating systems that employ this binning concept typically use two operations whenever a process calls a sub-process. The two operations are: 1) load sub-process and 2) run sub-process. In the known run sub-process operation, the kernel portion of the operating system checks the memory to ensure that all bins of the called sub-process are currently resident. The check occurs between loading the sub-process and requesting running of the sub-process, because it is possible that bins of the loaded sub-process have been swapped out. If all bins of the invoked sub-process are not resident, the kernel swaps each non-resident bin into the internal memory, either immediately if nothing else is resident at the target address, or after swapping out any bins currently residing at the target address. The time and resources required to check whether bins are already in memory and then swapping when necessary decreases system performance. In the case where a sub-process is called twice in a row, such checking is a waste of resources.

SUMMARY

A system and method is provided which executes a sub-process without first requiring a kernel to determine whether the sub-process resides in an internal memory, as long as certain conditions have been satisfied. In one embodiment, one of the conditions is that a programmer determines that the sub-process has been previously loaded into internal memory and executed. In another embodiment, the condition can be that the programmer has ensured that a process calling the sub-process has not called any other sub-process between the last execution and the current execution request. Yet another embodiment can have the programmer ensure that the system has not called another overlapping sub-process between the last execution and the current execution request.

In one aspect, a computer readable medium stores a computer program for executing a sub-process. The medium includes a fast run sub-process command that runs the sub-process without an operating system kernel first determining whether the sub-process to be executed actually resides in internal memory.

In still another aspect, a method is provided for managing memory when executing a sub-process in an operating system. The method includes instructing a kernel to load a first sub-process into internal memory of a processor. The method also includes instructing the kernel to run the first sub-process after it is loaded into the internal memory. The kernel checks the internal memory for a presence of bins of the first sub-process prior to execution of the first sub-process. When no other sub-process has been executed since finishing execution of the first sub-process, the method also includes calling a fast run sub-process to re-run the first sub-process without checking the internal memory for the presence of the bins of the first sub-process.

In yet another aspect, a digital signal processor (DSP) lacks sufficient memory to store a software image. The DSP includes an internal memory, and a processing unit. The processing unit executes sub-process instructions invoked by a process without first checking whether the sub-process instructions are resident in the internal memory.

In a further aspect, a computer readable medium stores computer program code for executing a process unit. The medium includes a fast run command, that executes the process unit in response to being invoked by a calling process. The medium also includes a process unit tracking code segment that notes when every process unit has been loaded into an internal memory and has been executed. The fast run command is used when the process unit tracking code segment has determined the invoked process unit was previously loaded into the internal memory and previously executed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying FIGs. It is to be expressly understood, however, that each of the FIGs is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing.

DETAILED DESCRIPTION

Figure 1A:
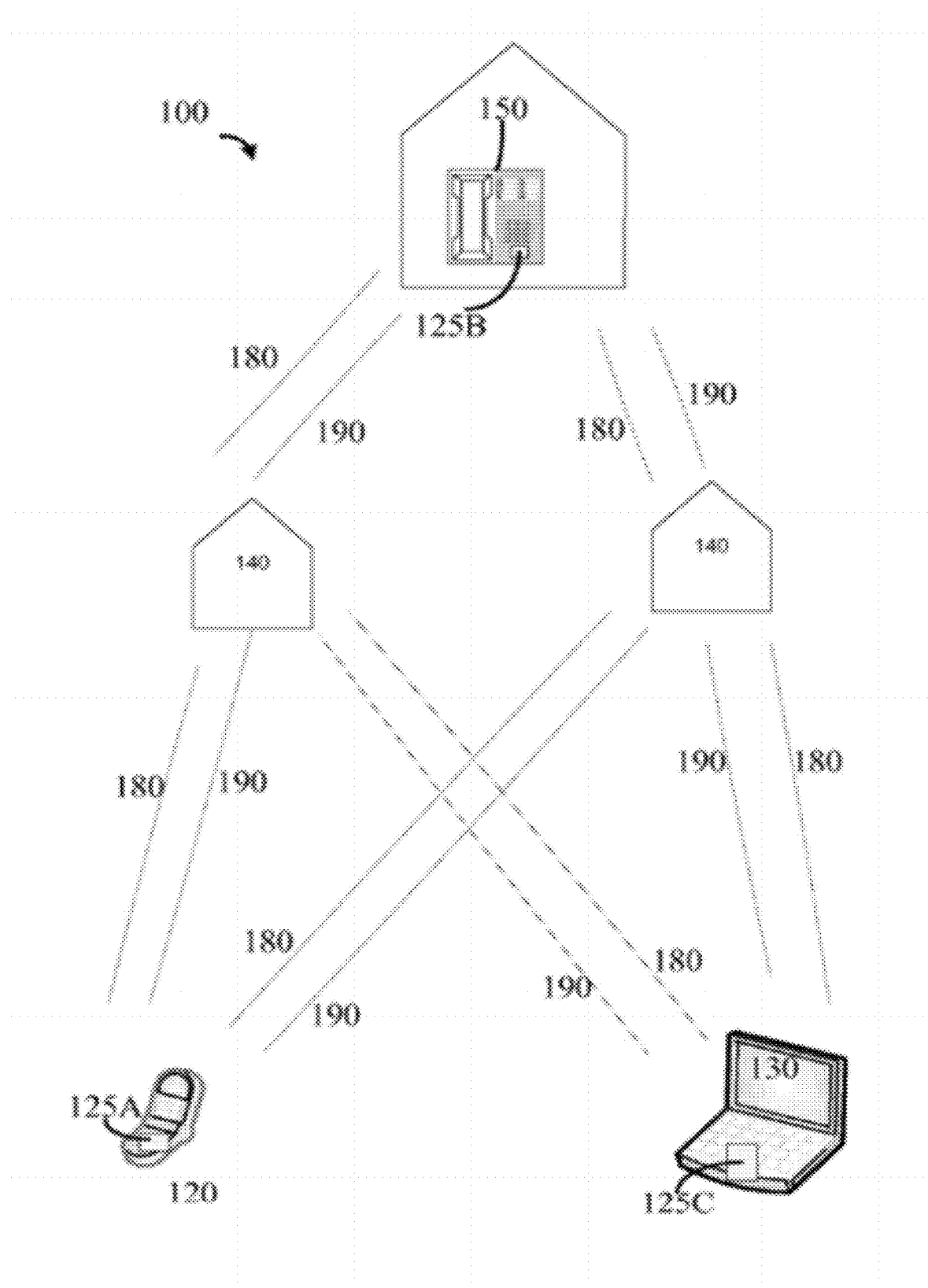
FIG. 1A is a block diagram showing an exemplary wireless communication system in which an embodiment of the disclosure may be advantageously employed.

FIG. 1 shows an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include improved microprocessors 125A, 125B, and 125C, respectively, executing a real time operating system (RTOS), according to embodiments of the invention as discussed further below. FIG. 1 shows forward link signals 180 from the base stations 140 and the remote units 120, 130, and 150 and reverse link signals 190 from the remote units 120, 130, and 150 to base stations 140.

In FIG. 1, the remote unit 120 is shown as a mobile telephone, the remote unit 130 is shown as a portable computer, and the remote unit 150 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any device which includes a microprocessor.

The microprocessor 125A, 125B, and 125C can include a set of instructions that can be executed to cause the microprocessor 125A, 125B, and 125C to perform any one or more of the methods or computer based functions disclosed herein.

As illustrated in FIG. 1, the remote units 120, 130, 150 may include a microprocessor 125A, 125B, and 125C, e.g., a central processing unit (CPU), a graphics processing unit (GPU), a digital signal processor (DSP) or each. Moreover, the remote units 120, 130, 150 can include an internal memory and an external memory that can communicate with each other via a bus. The remote units 120, 130, 150 may further include a video display unit, such as a liquid crystal display (LCD), an organic light emitting diode (OLED), a flat panel display, a solid state display, or a cathode ray tube (CRT). Additionally, the remote units 120, 130, 150 may include an input device, such as a keyboard, and a cursor control device, such as a track ball. The remote units 120, 130, 150 can also include a disk drive unit, a signal generation device, such as a speaker or remote control, and a network interface device, for example a wireless transceiver.

In a particular embodiment, as depicted in FIG. 1, the disk drive unit may include a computer-readable medium in which one or more sets of instructions, (e.g., software) can be embedded. Further, the instructions may embody one or more of the methods or logic as described herein. In a particular embodiment, the instructions may reside completely, or at least partially, within an internal memory, and/or external memory during execution by the microprocessor 125A, 125B, 125C. The memory may include computer-readable media.

Figure 1B:
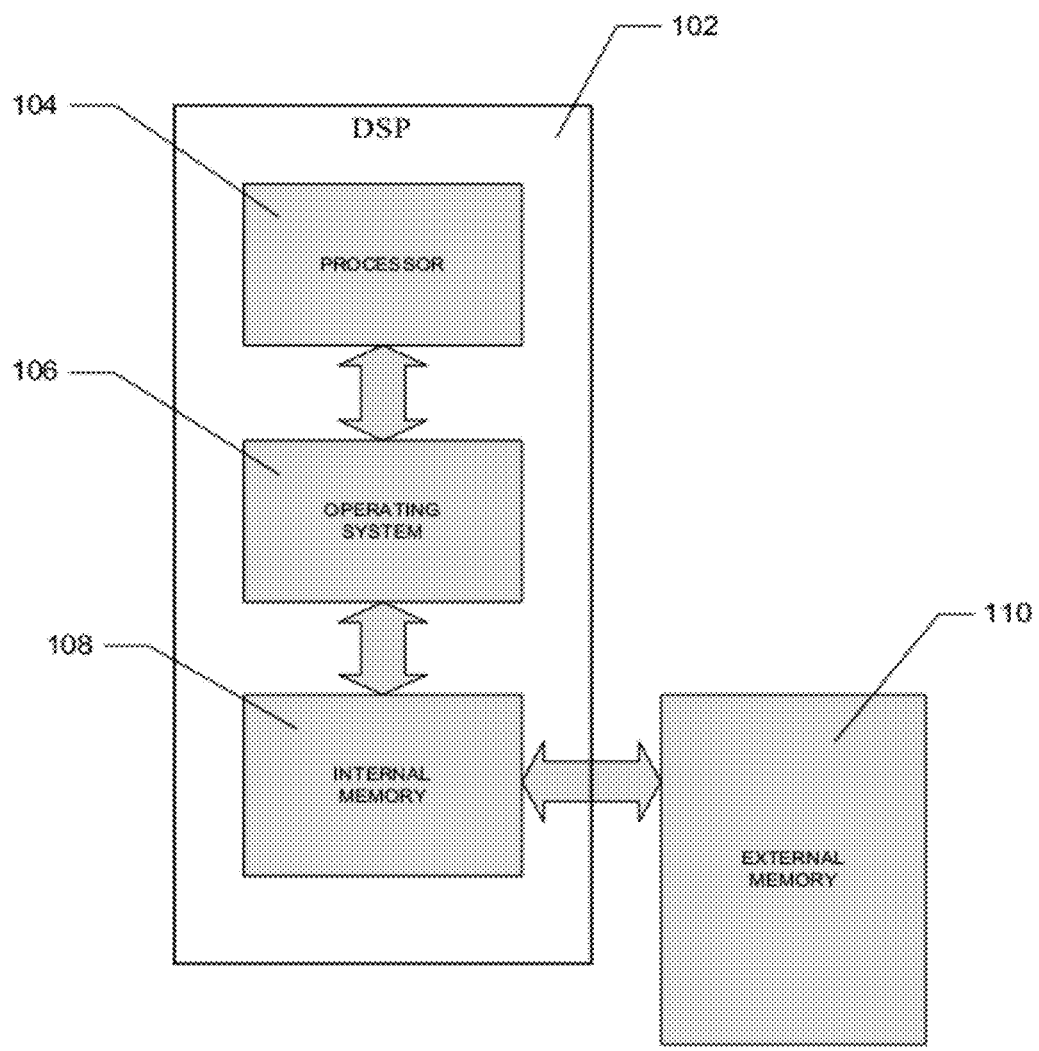
FIG. 1B is a block diagram showing an exemplary digital signal processor (DSP), according to an aspect of the present disclosure.

When a microprocessor, such as any of the processors 125A, 125B, 125C has too little internal memory to store software images, memory management is controlled by a proper sequence of operations, as established by a programmer. Such memory management occurs, for example, when a firmware image is larger than the internal memory of the microprocessor. The programmer designs the computer program, such as a real time operating system (RTOS), to include the memory management features of the present disclosure. As a result of managing the memory, the computer program can be run more efficiently by streamlining execution of the program. By tracking memory allocation, a programmer decides when it is necessary to confirm whether a called sub-process is resident in memory, permitting optimized sub-process calls when appropriate. The streamlined execution will be referred to as a fast sub-process. In one embodiment, the microprocessor 125A, 125B, 125C is a digital signal processor (DSP). Referring to FIG. 1B, the DSP 102 may include a processor 104 in communication with internal memory 108. External memory 110 may be configured for storing data and communicating with the internal memory 108 to swap data in response to instructions from an operating system 106 of the DSP.

Processes are independently executing programs in a multi-tasking environment. Processes can represent distinct applications or multiple instances of a single application. Each process has it own individual virtual address space and can contain one or more sub-processes.

A sub-process is a process unit that is loaded and executed dynamically by a user application. A sub-processes executes like a function call but has its own context, running in its own memory space. Generally speaking, the process level functionality is split into more than one sub-process.

Once loaded, a sub-process needs to be in internal memory when its calling process is executing. If a sub-process gets swapped out by another process, the kernel reloads it when the calling process is awakened. Thus, as noted above, in conventional sub-process execution the kernel checks whether a sub-process is already resident in internal memory prior to executing the sub-process. More specifically, the kernel checks whether all segments (bins) of the called sub-process are loaded into the internal memory.

According to the present disclosure, a fast run command (i.e., fast run sub-process) can be provided to execute a called sub-process, without checking whether the bins reside in memory. In other words the run command processing can be streamlined. The fast sub-process (i.e., sub-process executed with the fast run command) relies upon the application or programmer to ensure that some conditions have been met. Thus, once called, the fast run sub-process command runs the called sub-process without performing the bin checking, thereby improving run time performance and cycle overhead.

Figure 3:
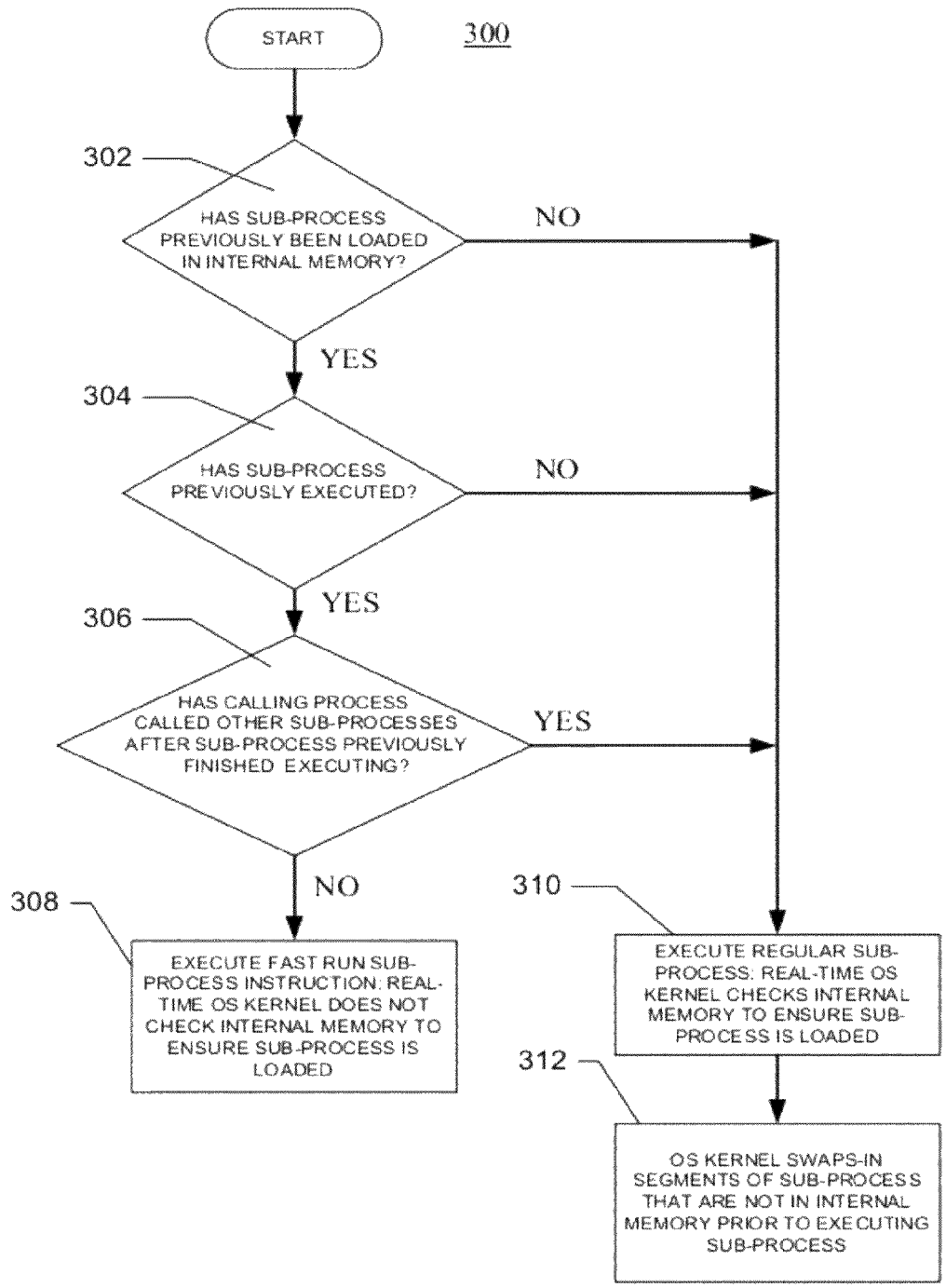
FIG. 3 is a flow chart showing an exemplary logic flow.

Prior to calling the fast sub-process, the programmer ensures that the program is designed such that necessary bins of the sub-process are already loaded into memory. Referring to FIG. 3, a method 300 is disclosed. In blocks 302 and 304, the programmer's responsibility, at the time when calling this fast sub-process, is to ensure that the sub-process was previously loaded and run. The program is also written to ensure that the executing process has not called any other sub-processes, in block 306. Finally, the programmer ensures that no other sub-process that is overlaid with the fast sub-process is invoked during the entire execution (not just from within the executing process). If all of these conditions have been met, the program can be designed to use the fast sub-process in block 308, rather than the normal sub-process in block 310.

The programmer is aware of whether the called sub-process is loaded in memory based on a usage model of the process, and the overall execution profile. From the overall execution profile the programmer is aware of whether other sub-processes (from outside the process) would overlay with the fast sub-process. The programmer uses a local memory map to know what is in each memory location. The usage model of the process informs the programmer of whether the process has called another sub-process since last loading and running the potential fast sub-process. A sub-process is managed from a process context. Thus, within a process, a programmer keeps track of what is in memory, also using a memory map. The programmer takes all of this into account when designing a program using the fast sub-process.

As noted above, the programmer knows how sub-processes would overlap in memory. Thus, when the programmer encounters a scenario when a sub-process may have swapped out the bins of the recently loaded sub-process, the programmer requests a normal sub-process execution in block 310, to ensure all the bins are in memory in block 312. But in the usage model in which the programmer knows that the bins of the called sub-process have not been pushed out, the programmer can use the fast sub-process.

Although the description has been with reference to a programmer ensuring the conditions have been met, such a determination can occur during execution of the program. In this case, the operating system can track when sub-processes are loaded into internal memory and executed. The fast run command is used when the operating system has determined the invoked sub-process was previously loaded into the internal memory and previously executed. The operating system can run a fast sub-process when it is determined that no other sub-process has been loaded into the internal memory or executed between a current use of the fast run command and a prior loading and prior executing of the invoked sub-process. In order to use the fast run command, the operating system should also ensure that no other previously invoked sub-process overlaps with the invoked sub-process. In yet another embodiment, a compiler performs the analysis.

In one embodiment, the fast sub-process does not enforce mutual exclusion across processes. That is, regardless of whether another sub-process from another process would overlap in memory with the called sub-process, if the other sub-process was called, fast sub-process should not be used. Stated another way, once the fast sub-process is loaded, any other sub-process should not be loaded. This is true whether or not the other sub-process overlaps the base and length registers with the fast sub-process.

In this embodiment the kernel maintains a set of data structures for all the loaded sub-processes. If one sub-process is loaded and the kernel then loads another sub-process, the latter sub-process overrides those data structures. In this embodiment, once the data structures are populated, they are never touched so the kernel does not have to ensure they are correct. Thus, in this embodiment, it is the programmer's responsibility to ensure that no other sub-processes have been called.

In an alternate embodiment, other mutually exclusive sub-processes can be called prior to running fast sub-process. That is, if another sub-process is called but that other sub-process would not swap out bins of the fast sub-process, the fast sub-process can still be used.

In one embodiment, fast sub-process runs all of the sub-processes. In another embodiment, fast sub-process runs only some of the sub-processes. In other words, one sub-process can be a fast sub-process and another sub-process can be a normal sub-process.

Figure 2:
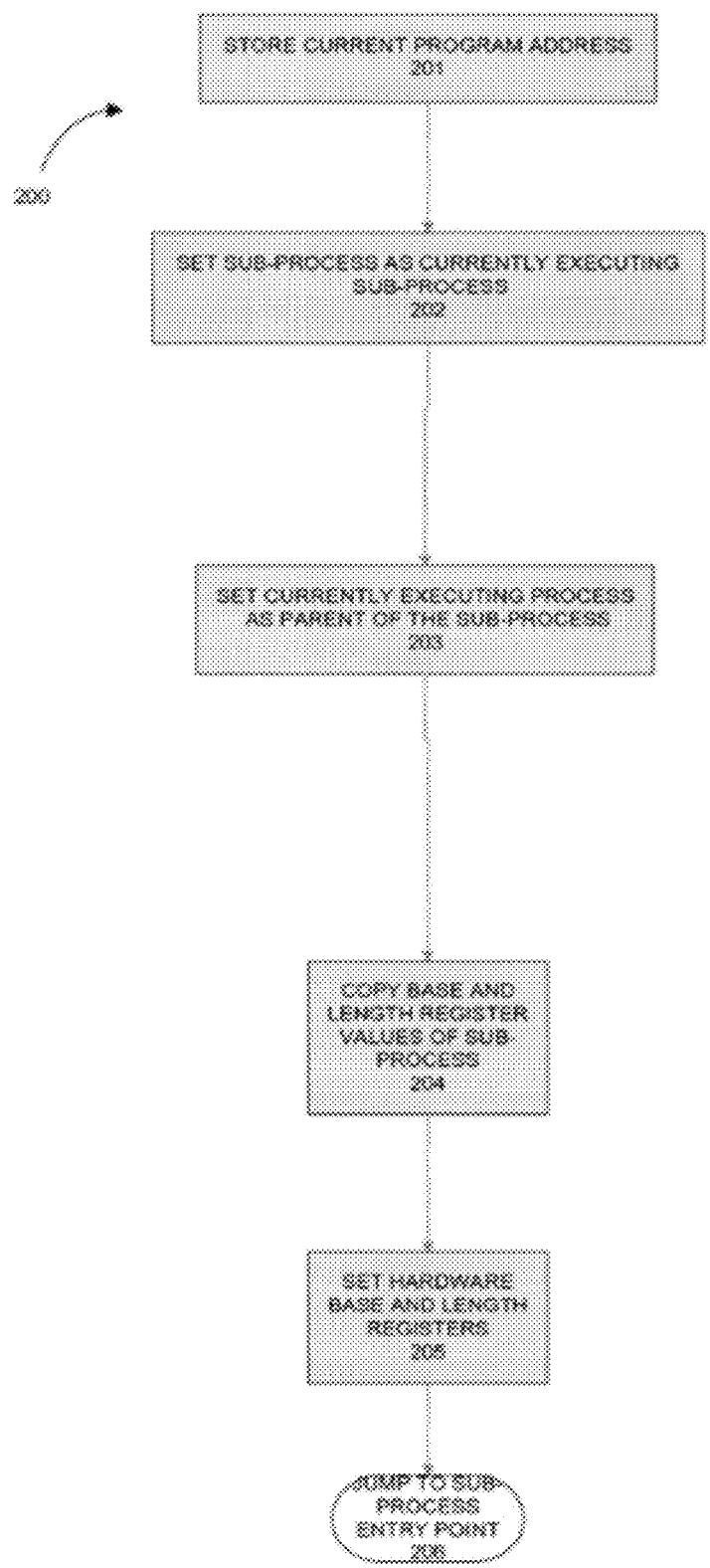
FIG. 2 is a flow chart showing an exemplary logic flow for running a fast sub-process.

Referring now to FIG. 2, process 200 is an exemplary logic flow for running a fast sub-process will be described. Initially, process 201 records the location of the currently executing process. In one embodiment, the program counter (address) is stored in a process control block for the executing process. The location storage will enable a return to the correct location after the sub-process completes execution.

Process 202 stores a list of sub-processes of the currently executing process. In other words, the current sub-process is set as one of the executing sub-processes in the system. Storage of the list enables a scheduler to decide whether to swap out bins belonging to the sub-process, if necessary. If the scheduler is called, the scheduler can check if all bins owned by the sub-process are in internal memory. If not, the scheduler can swap in the proper bins from external memory.

The list can be used when a higher priority sub-process is invoked, or when another sub-process is called so priorities can be compared. Also, if the sub-process enters a wait state while some data or timer is expected, then a different process or sub-process can run. The scheduler ensures that when returning back to the original process, if it's executing a sub-process, the sub-process bins should be swapped in.

Process 203 sets the currently executing process as the parent of the sub-process to permit sharing of the sub-process with other processes. Although process 203 is depicted in FIG. 2, such a process could be easily omitted without affecting the functionality of the overall process 200. In another embodiment, the decision on whether to execute process 203 occurs dynamically. That is, when sharing is to occur process 203 executes. When sharing will not occur, process 203 is omitted.

Process 204 copies base and length register values for the sub-process to the process control block of the currently executing process. The base and length register values are copied from their storage location, for example, external memory. These values within the process control block are then used to set up the context of the sub-process. The base and length register values are set in the microprocessor for memory management and protection.

Process 205 sets the microprocessor registers in accordance with the base and length register values. These values are obtained from the process control block of the process to be executed next.

Finally, process 206 passes control to the sub-process entry point.

In one embodiment the control is passed with an RTI (return from interrupt) to the top of a stack on which the entry point of the sub-process was pushed in process 203. According to the present disclosure, no jump to the scheduler occurs at this time. Thus, no checking nor swapping of bins occurs prior to actual running of the sub-process.

In one embodiment, the fast sub-process and regular sub-process include common code. When fast sub-process is invoked, a flag is set indicating the same. The code that is different is run based upon whether the flag is set. For example, process 206 jumps fast sub-process directly to the sub-process. In the regular sub-process at that time, the scheduler would be called. Thus, a check is made to see whether fast sub-process has been invoked (based upon the flag). If so, process 206 executes. If not, the regular sub-process executes.

Accordingly, the present disclosure provides an efficient solution to execute sub-processes without incurring unnecessary overhead.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture data communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present invention and its advantages have been described in detail, it should be understood that various changes, substitutions and alterations can be made herein without departing from the spirit and scope of the invention as defined by the appended claims. For example, although the logic has been described with respect to invoking sub-processes, it is envisioned that the logic also has applications with respect to invoking processes. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-transitory computer readable medium storing computer program code for executing a sub-process, the computer program code comprising code:
   to execute a fast run sub-process instruction that runs the sub-process without an operating system kernel first determining whether the sub-process to be run resides in an internal memory only after ensuring the sub-process has been previously loaded into internal memory,
   to ensure the sub-process has been previously executed, and
   to ensure a process that is executing the sub-process has not called any additional sub-processes after the sub-process previously finished executing.

2. The medium of claim 1, wherein the fast run sub-process instruction executes when the sub-process has been previously loaded into the internal memory and previously executed.

3. The medium of claim 1, wherein the fast run sub-process instruction executes when no other sub-process has been loaded into the internal memory or executed by a calling process between the call to the fast sub-process instruction and a prior loading and prior executing of the sub-process.

4. The medium of claim 1, wherein the fast run sub-process instruction executes only when a system has not called an overlapping sub-process since running the sub-process.

5. The medium of claim 1, further comprising a run sub-process instruction in which the kernel loads the sub-process into internal memory, and executes the sub-process, the kernel executing the sub-process after the kernel confirms that the sub-process is resident in the internal memory.

6. The medium of claim 5, wherein the kernel is a real time operating system (RTOS) kernel.

7. The medium of claim 5, wherein the kernel swaps in segments of the sub-process that are not resident internal memory, prior to executing the sub-process.

8. The medium of claim 1, wherein the fast run sub-process instruction designates the sub-process as an executing sub-process within an overall system.

9. The medium of claim 1, wherein the fast run sub-process instruction copies base and length register values to a process control block of a process invoking the sub-process.

10. The medium of claim 1, further comprising code for setting a flag when the fast run sub-process code segment has been invoked, the flag indicating whether specific fast run sub-process instructions or normal run sub-process instructions are executed.

11. A method for managing memory when executing a sub-process in an operating system, the method comprising:
   instructing a kernel to load a first sub-process into internal memory of a processor;
   instructing the kernel to execute the first sub-process after it is loaded into the internal memory, the kernel first checking the internal memory for a presence of bins of the first sub-process prior to execution of the first sub-process; and
   when no other sub-process has been executed by a calling process since finishing execution of the first sub-process, calling a fast sub-process to re-run the first sub-process without checking the internal memory for the presence of the bins of the first sub-process.

12. The method of claim 11, wherein the processor is a digital signal processor (DSP).

13. The method of claim 12, wherein the DSP has an amount of memory that is smaller than at least one firmware image.

14. The method of claim 11, wherein calling the fast sub-process further comprises calling the fast sub-process only when a process calling the fast sub-process has not called another sub-process since last running the first sub-process.

15. The method of claim 11, wherein calling the fast sub-process further comprises calling the fast sub-process only when a system has not called an overlapping sub-process since running the first sub-process.

16. The method of claim 11, wherein calling the fast sub-process further comprises calling the fast sub-process only when no other sub-process has been loaded or executed since running the first sub-process.

17. A digital signal processor (DSP) comprising:
   internal memory; and
   a processing unit that executes instructions of a first sub-process called by a process without first checking whether the first sub-process instructions are resident in the internal memory only after ensuring the sub-process has been previously loaded into internal memory,
   ensuring that the sub-process has been previously executed, and
   ensuring that a process that is executing the sub-process has not called any additional sub-processes after the sub-process previously finished executing.

18. The digital signal processor (DSP) of claim 17, wherein the processor executes kernel instructions that loads the first sub-process instructions into the internal memory and execute the first sub-process after confirming the first sub-process instructions are resident in the internal memory.

19. The digital signal processor (DSP) of claim 18, wherein the processor subsequently executes the first sub-process instructions without first checking whether the first sub-process instructions are resident in the internal memory only when the kernel has previously loaded the sub-process instructions into the internal memory and previously executed the sub-process instructions.

20. The digital signal processor (DSP) of claim 17, wherein the processor executes the first sub-process instructions without first checking whether the first sub-process instructions are resident in the internal memory only when no other sub-process instructions were loaded into the internal memory by a calling process and executed between a previous execution of the sub-process instructions and a current execution of the sub-process instructions.

21. The digital signal processor (DSP) of claim 17, wherein the processor executes the first sub-process instructions without first checking whether the first sub-process instructions are resident in the internal memory only when no overlapping sub-process instructions were loaded into the internal memory between a previous execution of the first sub-process instructions and a current execution of the first sub-process instructions.

22. A non-transitory computer readable medium storing computer program code for executing a process unit, the medium comprising:
   a fast run command, the fast run command executing the process unit in response to being invoked by a calling process and without checking whether the process unit resides in internal memory; and
   a process unit tracking code segment that notes when every process unit has been loaded into an internal memory and has been executed, wherein the fast run command is used when the process unit tracking code segment has determined the invoked process unit was previously loaded into the internal memory and previously executed.

23. The medium of claim 22, wherein the fast run command is used when the process unit tracking code segment has determined that no other process unit has been loaded into the internal memory or executed between a current use of the fast run command and a prior loading and prior executing of the invoked process unit.

24. The medium of claim 22, wherein the fast run command is used when the process unit tracking code segment has determined that no other previously invoked process unit overlaps with the invoked process unit.

25. The medium of claim 22, wherein the fast run command and the process unit tracking code segment are part of an operating system.

26. The medium of claim 1, in which the computer program code further comprises code:
   to execute a regular sub-process instruction corresponding to the fast run sub-process instruction upon failure of the ensuring, in which executing the regular sub-process instruction comprises:
   determining, by an operating system kernel, whether the sub-process to be run resides in an internal memory.

27. An apparatus for executing a sub-process, comprising:
   means for executing a fast run sub-process instruction that runs the sub-process without an operating system kernel first determining whether the sub-process to be run resides in an internal memory only after ensuring the sub-process has been previously loaded into internal memory,
   means for ensuring the sub-process has been previously executed, and
   means for ensuring a process that is executing the sub-process has not called any additional sub-processes after the sub-process previously finished executing.

28. The apparatus of claim 27, integrated into one of a mobile phone, personal data assistant (PDA), fixed location data unit, microprocessor and a computer.

29. An apparatus, comprising:
   means for executing instructions of a first sub-process called by a process without first checking whether the first sub-process instructions are resident in the internal memory;

means for after ensuring the sub-process has been previously loaded into internal memory before executing;

means for ensuring that the sub-process has been previously executed; and means for ensuring a process that is executing the sub-process has not called any additional sub-processes after the sub-process previously finished executing.

30. The apparatus of claim 29, integrated into one of a mobile phone, personal data assistant (PDA), fixed location data unit, microprocessor and a computer.

31. The apparatus of claim 29, integrated into one of a mobile phone, personal data assistant (PDA), fixed location data unit, microprocessor and a computer.

32. The medium of claim 1, integrated into one of a mobile phone, personal data assistant (PDA), fixed location data unit, microprocessor and a computer.

33. The DSP of claim 17, integrated into one of a mobile phone, personal data assistant (PDA), fixed location data unit, microprocessor and a computer.

34. The medium of claim 22, integrated into one of a mobile phone, personal data assistant (PDA), fixed location data unit, microprocessor and a computer.

* * * * *